United States Patent Office 3,195,376
Patented July 20, 1965

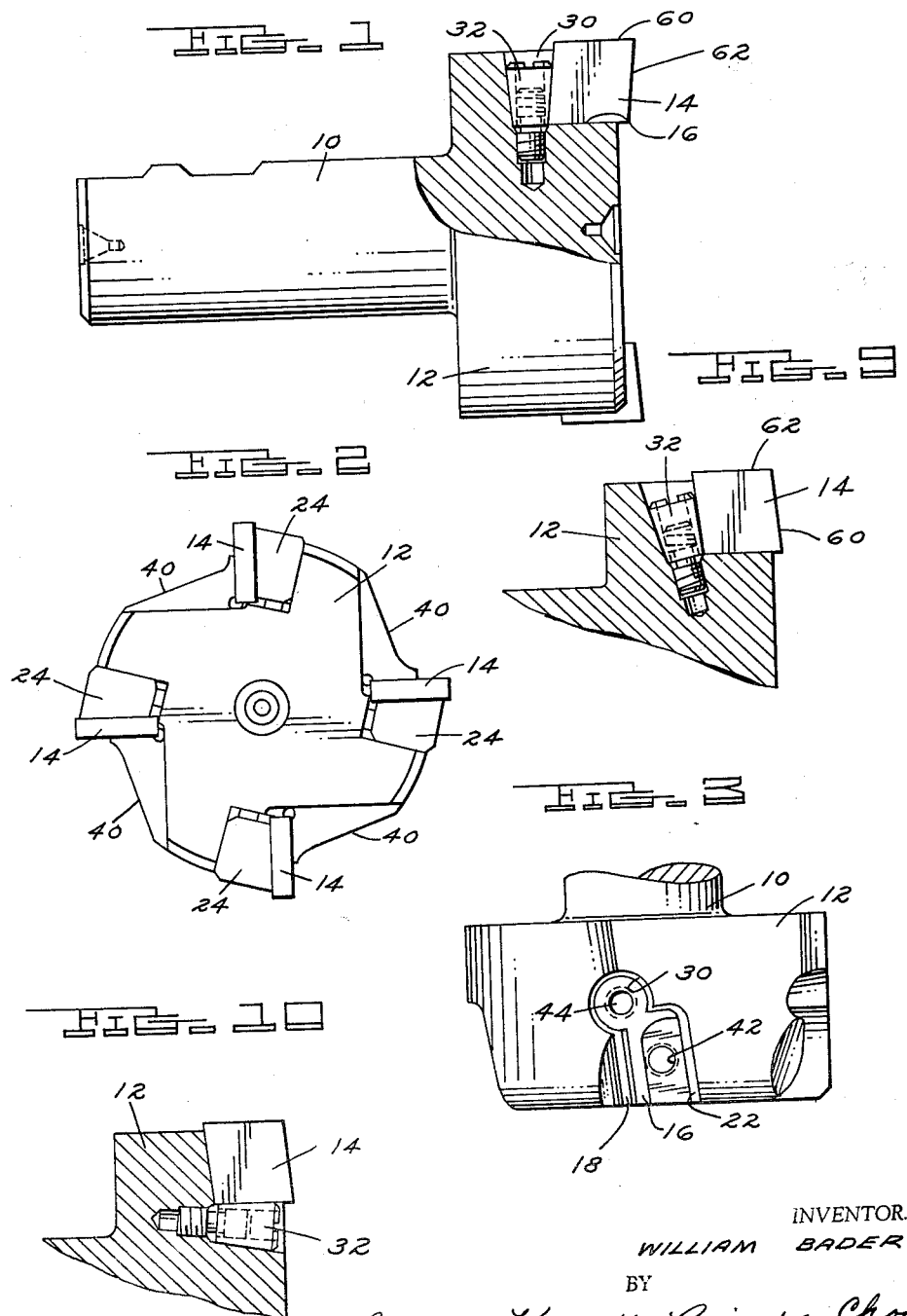

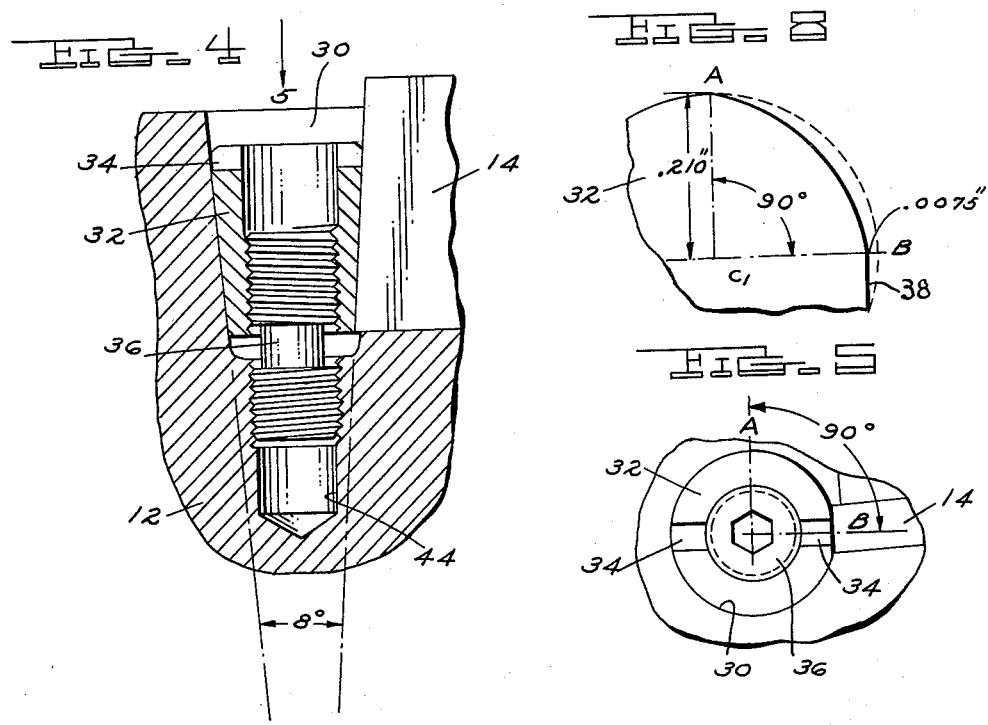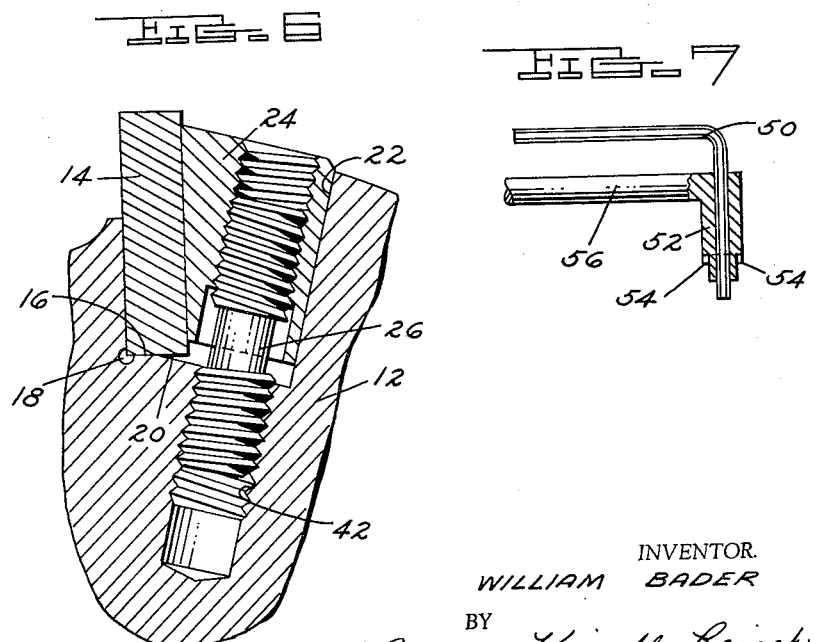

3,195,376
BORING HEAD
William Bader, Ferndale, Mich., assignor, by mesne assignments, to Fansteel Metallurgical Corporation, North Chicago, Ill., a corporation of New York
Filed Mar. 1, 1963, Ser. No. 261,970
6 Claims. (Cl. 77—58)

This invention relates to a boring head and particularly that type of head which utilizes a so-called indexable throwaway insert of carbide material or other cutting substance. The device may also be used as an end mill.

It is an object of the present invention to provide a boring head with indexable inserts which may be used for general purpose milling of steel and cast iron. With the disclosed inserts, the device may be used for straight shank 90° shoulder milling.

It is also desirable that there be an extremely accurate adjustment on the device for the inserts and that the construction be such that it can be utilized on small diameters, for example, from 2" on up. The tool can be used either for heavy roughing or fine finishing, and this is made possible by the fine adjustment available in the device, which permits compensation for any variations in insert manufacturing tolerance, allowing precise location of cutting edges.

Other objects and features of the invention relating to details of construction and operation will be apparent in the following description and claims.

Drawings accompany the disclosure and the various views thereof may be briefly described as:

FIGURE 1, a side elevation of a tool partially in section showing the relationship of the parts.

FIGURE 2, an end view of the tool.

FIGURE 3, a side view of the tool body showing one insert station without any parts.

FIGURE 4, an enlarged section of the adjustment device.

FIGURE 5, an enlarged view of the adjustment device taken on line 5 of FIGURE 4.

FIGURE 6, an enlarged view of the clamping device of the unit.

FIGURE 7, a view of an adjustment wrench.

FIGURE 8, an enlarged view of the cam quadrant showing the reduction in dimension and the flat surface at the end of the cam.

FIGURE 9, a partial section showing a head with a reversal insert to permit a boring operation with a forward lead angle.

FIGURE 10, a partial section showing a boring head with radial adjustment pin and forward lead angle.

Referring to the drawings:

The tool has a shank 10 with a head 12 formed thereon, said head, in the example shown, having four insert stations containing carbide inserts 14, these inserts being of a parallelogram shape with an acute angle at two of the opposite corners and an obtuse angle at the other opposite corners. In the example shown, the acute angle is 86° and the obtuse angle is 94°.

The insert 14 lies against the bottom of the insert recess 16 which is in line with the axis of the head; but as shown in FIGURE 6, this surface 16 is narrower than the insert 14 because of a relief groove 18 and a relief area 20. This results in a surface 16 narrower than the edge of the insert so that it falls between the edges thereof and accordingly the edges are protected against wear or chipping prior to their use as cutting edges. This also provides clearance for build-up on used edges. It frequently happens that the material being cut will deposit on the cutting edges causing this build-up. In the absence of clearance, the position of the insert might be inaccurate when a used edge was turned into the recess.

Adjacent the insert recess is a second recess 22 which holds a wedge 24 controlled by a differential screw 26, having one end threadingly engaging the head 12 and the other end threadingly engaging a tapped hole in the wedge. The threads are of opposite hand and different pitch in the same diameter so that the turning of the screw by a suitable wrench will cause lifting and lowering of the wedge 24.

Axially behind the insert 14 is a conically shaped recess 30 which receives an internally threaded adjusting sleeve 32 having substantially the shape of a truncated cone with a transverse slot 34 in its top surface. A differential screw 36, having a portion threadingly engaging the head 12 and a portion threadingly engaging the tapped hole in the adjustment sleeve 32, is provided to cause lifting and lowering of the cone-shaped element. The locking screw 26 for the adjusting sleeve 32 can, for example, have a left-hand thread ¼"-32 in the sleeve 32 and a right-hand thread ¼"-28 in the head 12. The same screw can be used in the wedge as in the pin so that the inventory problem is lessened.

The adjusting sleeve 32 has been defined as substantially conical since, while it has conical walls with an 8° included taper throughout most of its circumference, there is a 90° area as shown in FIGURE 5, wherein the outside surface is reduced from a surface slant line A to a surface slant line B to provide an adjustment surface or wall 38. The term "slant line" is used to designate a line originating at the base of the cone and terminating at the apex of the conical outline. This is shown in greater detail in FIGURE 8 where it will be seen that a radius, for example, of .210" is reduced .0075" in 90°, terminating in a chordal flat 38.

It will be seen that the insert 14 is positioned against the lowest portion of this adjustment wall 38 in FIGURE 5. When the screw 36 is loosened and a tool inserted in the slot 34 to rotate the adjusting sleeve 32 in a clockwise direction as viewed in FIGURE 5, the insert 14 is moved axially of the head. The surface between the slant lines A and B of the adjusting sleeve 32 presents a uniform rise which changes .0075" in 90°. This means that for every 15°, there is .00125" rise, and for every 7°30' there is a .00062" rise. The adjusting sleeve 32 is preferably formed, for example, of 6150 steel and hardened and ground. The head 12 is cut away at 40 to provide chip clearance. The 8° angle of the adjusting sleeve 32 is, of course, a locking angle and may be varied within the range of locking angles but is preferably not so large as to be a non-locking taper. In the present example, the angle co-operates with the angle of the insert to allow straight shoulder milling.

In FIGURE 3, the head 12 is shown without any parts. It thus has a recess 30 for the adjusting sleeve 32 and a wedge recess 22 with the tapped hole 42 for the wedge screw 26. A threaded hole 44 is shown in recess 30 for the screw 36. The surface 16 upon which one edge of the insert rests is shown and also the cutaway recess 18. It will thus be seen that with the assembled unit, the inserts 14 are locked in place in a standard fashion by utilizing the screw actuated wedges 24.

However, the inserts are backed up by the adjusting sleeve 32 which can be adjusted through a 90° angle to change the setting of the inserts as much as .0075". This is more than the normal manufacturing variation of carbide inserts and when an extremely fine finish is desired for end milling, the inserts can be adjusted axially so that they all extend the same distance from the front surface of the head. In addition, the adjusting sleeve has the advantage of being locked in place by reason of the inherent locking nature of the 8° included angle, and thus it forms a solid back-up for the carbide insert which again is a surface contact between the cutting edges of the insert at the back edge so that the edges are not chipped by reason of the shock loads that are applied to the insert.

In FIGURE 7, an adjustment wrench, convenient for use with the device, consists of a regular Allen wrench 50 inserted through a hollow tube 52 which has two projections 54 receivable in the slot 34 of the adjusting sleeve 32. Thus, the Allen wrench can be used to loosen the screw 36, and the handle 56 on the tube 52 can be used to shift the adjusting sleeve a predetermined amount after which the Allen wrench is used to tighten the screw. The clearance hole in the hollow tube 52 is sufficiently oversize to permit the Allen wrench 50, freedom of movement.

Due to the nature of the shape of the insert 14, it will be seen that the edge 60 is parallel to the axis of the head and the edge 62 is angled back from the cutting corner to provide work clearance. This permits a so-called square shoulder milling operation wherein the wall of the slot milled has a right angle to the base. It will be noticed that adjustment of the insert by the adjusting sleeve 32 will not affect the disposition of the edge 60 (in other words, the tool will hold size) but simply shift the edge 62 relative to the front surface of the head; that is, the face run out is adjustable and the size and concentricity are maintained at all times.

In a boring head, an adjusting sleeve located inside the insert radially can control the size of the hole and the device can be similarly used in cutter bodies of many varieties. For example, in FIGURE 9, the insert 62 is shown in reverse position with the obtuse angle of the parallelogram at the corner. The adjusting sleeve 32 has been placed into the body at a different angle to accommodate the insert in this position, but it will be noticed now that the device has a forward lead angle at the edge 60 which permits it to be used as a boring cutter with a lead angle.

In FIGURE 10, a device is shown wherein, as suggested above, the adjusting sleeve is located radially inside of the insert. Thus, with adjustment, the sleeve can control both the size and the concentricity of the boring head so used. Since the adjustment is on each end of a diameter, there is possible a total of .015" of adjustment, doubling the amount for each particular adjusting sleeve. Other sizes of adjusting sleeves, of course, could have a different cam rise as desired.

It will thus be seen that the adjustable sleeve 32 provides a versatile back-up surface device for an insert which makes it possible to use the same cutting head for many different purposes by varying the angle and location of the sleeve. The sleeve makes it possible to compensate for manufacturing tolerances where an extremely fine finish is desired and also permits an adjustment within the limits of the cam surface where this is important.

I claim:

1. In a boring head of the type having throwaway pellet-shaped inserts held in an insert recess by a locking means, that improvement which comprises:
   (a) a head having an insert recess adjacent one surface thereof and a conical recess formed in said head directly adjacent and intersecting said insert recess,
   (b) a cutting insert in said insert recess,
   (c) an adjusting sleeve in said conical recess positioned directly behind one edge of each insert, said adjusting sleeve comprising a truncated cone-shaped element having a relatively low included angle with walls complemental to the walls of said conical recess,
   a portion of circumference of said sleeve having a uniformly receding surface originating at a slant line in the conical surface of the sleeve and terminating at a slant line a predetermined distance below the conical surface of the sleeve, said portion being approximately one-quarter of the circumference or less and being positionable at the intersection of said conical recess and said insert recess,
   (d) and means for releasably locking said adjusting sleeve in said conical recess wherein rotation of said adjusting sleeve within said recess will provide an adjustable back-up surface at one edge of the insert recess of said head.

2. A device as defined in claim 1 in which the adjusting sleeve is disposed substantially radially of the head and the cutting insert has a parallelogram shape with opposed acute angles of the parallelogram slightly less than 90° and the opposed obtuse angles of the parallelogram being proportionately greater than 90°, one outer edge of said insert being disposed parallel to the axis of the head and one inner edge of said insert lying in contact with the adjusting sleeve surface.

3. In a rotating cutter head of the type wherein carbide or the like inserts are held in an insert recess by a locking means, a back up means for one inner edge of said insert comprising:
   (a) a conically shaped adjusting sleeve pin disposed in a conical recess in said head,
   (b) a small portion of said conically shaped adjusting sleeve on the outer surface being formed as an adjusting cam surface originating at a slant line on the conical surface and terminating at a line circumferentially spaced from said slant line and a predetermined distance below the conical surface, said adjusting sleeve having an included angle which provides a locking angle in said recess, and
   (c) a locking means for said conical adjusting sleeve having a portion anchored on said head and a portion anchored in said conical adjusting sleeve to releasably position said sleeve in said conical recess.

4. A rotating cutter head of the type defined in claim 3 in which an insert is used having a parallelogram shape with opposed acute angles of the parallelogram being less than 90° to the same extent as one-half of the included angle of the conical adjusting sleeve wherein one outer edge of said insert is disposed parallel to the axis of the head while one edge of the insert lies in contact with the adjusting cam surface of the adjusting sleeve.

5. In a tool head of the type having throwaway pellet-shaped inserts held in an insert recess by a locking means, that improvement which comprises:
   (a) a head formed with an insert recess and having adjacent the insert recess a conical recess merging with the insert recess,
   (b) a cone-shaped adjusting sleeve in said conical recess having walls to complement the walls of said conical recess and having a portion of its walls reduced in size radially from one slant line in its circumference to another line spaced circumferentially from said first line, said reduced portion being adapted to position at the point of merger with said insert recess to contact the edge of an insert in said recess, the remaining conical walls of said adjusting sleeve serving to stabilize and lock said sleeve in said conical recess, and
   (c) means to exert releasable axial pressure on said sleeve to lock it in said conical recess.

6. In a tool head of the type having throwaway pellet-shaped inserts held in an insert recess by a locking means, that improvement which comprises:
   (a) a head formed with an insert recess and having adjacent the insert recess a conical recess merging with the insert recess,
   (b) a cone-shaped adjusting sleeve in said conical recess having walls to complement the walls of said conical recess and having a portion of its walls reduced in size radially from one slant line in its circumference to another line circumferentially spaced from said first line, said reduced portion being adapted to position at the point of merger with said insert recess to contact the edge of an insert in said recess, the remaining conical walls of said sleeve serving to stabilize and lock said sleeve in said conical recess, and (c) manipulatable means to exert axial pressure on said sleeve to lock it in said conical recess in a locking motion and to forcibly release it from said recess in a releasing motion wherein said sleeve may be readily adjusted rotatably when shifted by said releasing motion.

References Cited by the Examiner

UNITED STATES PATENTS

| | | |
|---|---|---|
| 1,883,810 | 10/32 | Miller. |
| 2,186,423 | 1/40 | Miller. |
| 2,435,287 | 2/48 | Miller. |
| 2,814,854 | 12/57 | Murray. |

WILLIAM W. DYER, Jr., *Primary Examiner.*

J. SPENCER OVERHOLSER, *Examiner.*